US012080934B2

(12) United States Patent
Vosoogh

(10) Patent No.: US 12,080,934 B2
(45) Date of Patent: Sep. 3, 2024

(54) MULTI-LAYER FILTER, ARRANGEMENT, AND METHOD FOR PRODUCTION THEREOF

(71) Applicant: GAPWAVES AB, Gothenburg (SE)

(72) Inventor: Abbas Vosoogh, Gothenburg (SE)

(73) Assignee: GAPWAVES AB, Gothenburg (SE)

( * ) Notice: Subject to any disclaimer, the term of this patent is extended or adjusted under 35 U.S.C. 154(b) by 366 days.

(21) Appl. No.: 17/762,969

(22) PCT Filed: Sep. 24, 2020

(86) PCT No.: PCT/SE2020/050898
§ 371 (c)(1),
(2) Date: Mar. 23, 2022

(87) PCT Pub. No.: WO2021/076026
PCT Pub. Date: Apr. 22, 2021

(65) Prior Publication Data
US 2022/0359967 A1 Nov. 10, 2022

(30) Foreign Application Priority Data
Oct. 18, 2019 (SE) .................................... 1951183-1

(51) Int. Cl.
*H01P 1/207* (2006.01)
*H01P 3/12* (2006.01)
*H01P 3/123* (2006.01)

(52) U.S. Cl.
CPC .............. *H01P 1/207* (2013.01); *H01P 3/121* (2013.01); *H01P 3/123* (2013.01)

(58) Field of Classification Search
CPC ........ H01P 1/208; H01P 1/207; H01P 1/2088; H01P 1/04; H01P 1/042; H01P 1/08; H01P 3/12; H01P 3/121; H01P 3/123
See application file for complete search history.

(56) References Cited

U.S. PATENT DOCUMENTS 5,382,931 A 1/1995 Piloto et al.
6,154,106 A 11/2000 De Lillo
(Continued)

FOREIGN PATENT DOCUMENTS

CN 108941203 A 7/2017
EP 1 376 746 A1 1/2004
(Continued)

OTHER PUBLICATIONS

International Search Report, issued in PCT/SE2020/050898, dated Dec. 10, 2020.
(Continued)

*Primary Examiner* — Stephen E. Jones
(74) *Attorney, Agent, or Firm* — Birch, Stewart, Kolasch & Birch, LLP

(57) ABSTRACT

A multi-layer signal filter includes at least three physical layers. Each layer has through going apertures arranged with an offset to apertures of at least one adjoining layer, each layer further has a filter channel opening for receiving signals to be filtered. The apertures are arranged along a perimeter outside the filter channel opening and the apertures are arranged with a central surface portion increasing the edge length of the aperture.

20 Claims, 5 Drawing Sheets

(56) References Cited

U.S. PATENT DOCUMENTS

| | | | | |
|---|---|---|---|---|
| 2018/0248245 | A1 | 8/2018 | Okada | |
| 2020/0251799 | A1* | 8/2020 | Vosoogh | H01P 11/002 |

FOREIGN PATENT DOCUMENTS

| | | | |
|---|---|---|---|
| WO | WO 2019/072399 | A1 | 4/2019 |
| WO | WO 2019/083439 | A1 | 5/2019 |

OTHER PUBLICATIONS

Nocella et al., "Dual-band filters based on TM Dual-Mode cavities", Proceedings of the 44th European Microwave Conference, Oct. 6-9, 2014, pp. 179-182.

Written Opinion of the International Searching Authority, issued in PCT/SE2020/050898, dated Dec. 10, 2020.

English translation of International Search Report for International Application No. PCT/SE2020/050898, dated Dec. 10, 2020.

Swedish Search Report for Swedish Application No. PCT/SE2020/050898, dated Dec. 10, 2020.

* cited by examiner

MULTI-LAYER FILTER, ARRANGEMENT, AND METHOD FOR PRODUCTION THEREOF

TECHNICAL FIELD

The present invention relates generally to a multi-layer filter that is cost-effective to produce, compact, and can be used together with antenna arrays.

BACKGROUND ART

Filters are commonly used for removing unwanted parts of a signal, such as specific frequency bands. Examples are high-pass, low-pass, and band-pass filters. High-pass and low-pass filters removes frequencies below or above a specific frequency, band-pass filters let a certain range of frequencies pass through the filter. Different forms of signal filters are commonly known in the art and there is a plurality of filter technologies in the field of signal processing, such as digital filters, electronic filters, optical filters, mechanical filters, and waveguide filters.

In applications relating to for example 5G there is a demand from the market for arrays of antennas that have beam-steering capabilities and these antennas should not radiate in adjacent frequency bands. Without such solutions interference becomes an increasing problem. The filters suppress unwanted radiation in adjacent bands and need to be based on compact but efficient solutions. The columns in the antenna arrays are in many applications placed as closed together as half lambda, wherein lambda is the wavelength in free space. This provides difficulties for existing filter technologies.

Simultaneously, the use of wireless communication increase and, in some applications, the wireless communication replaces traditional wired or optic communication. One example is backhauled point-to-point communication links were wireless communication is becoming an alternative to optic fiber systems, especially when considering cost and flexibility. Given requirements for high transmission rates the frequency intervals used for such communication is preferably increased to cover higher frequency bands than before. One example is the E-band covering for example ranges between 71-76 GHz and 81-86 GHz and enabling multi-Gbit/s data transfer in backhaul point-to-point wireless links. The E-band is thus becoming an interesting band for such applications. However, higher frequencies provide stricter requirements for tolerance during manufacturing of components.

The prior art provides different filters for use in such applications. One example are filters produced by diffusion bonding that provides an accurate manufacturing method and possibilities to produce high performance components. However, such filters are expensive to produce and thus not a suitable alternative for large scale production.

Another available filter solution is substrate integrated waveguide (SIW) filters that are compact waveguide filters. Although cost efficient production methods exist for substrate integrated waveguide filters the end-product comprise an inherent insertion loss.

SUMMARY OF INVENTION

SIW filters have an inherent insertion loss that is higher than the corresponding loss of for example air-filled waveguide filters. Thus, although they provide a cost efficient alternative there are a need for other solutions. Air-filled waveguide filters generally have other draw backs, for example the magnetic fields penetrate a short distance into the metal creating leaks that become substantial if there is a gap between two layers, especially if the gap is in the horizontal direction. The reason for this is that the electromagnetic waves are tightly confined and meant to penetrate only a very short distance into the metal.

Dielectric waveguide filters are another option to reduce leakage however the characteristics of the problem is different for such filters due to for example the non-propagating evanescent wave. This is also the reason why such filters require high level of conductivity between layers in order to reduce leakage. The high level of conductivity significantly increases the production cost and requires very high accuracy during manufacturing. In addition, the losses are in general still higher than for air-filled waveguide filters.

A further problem exists in relation to manufacturing of waveguide filters is that the current level of CNC-milling and molding often provides bad tolerances in the production method compared to other methods such as laser cutting or etching. This makes it difficult and/or expensive to produce waveguide filter structures. The problem is more evident for some frequency ranges than for others, for example both CNC-milling and molding are common production methods for waveguides adapted for frequencies below 60 GHz. In higher E-band and D-band frequency range, 71 GHz to 86 GHz and 110 GHz to 170 GHz, the CNC-milling and molding becomes very expensive because everything is very small in relation to how the production technology works. Thereby, it is in some cases not suitable and in some cases not even possible to achieve the desired result.

An object is to provide a signal filter that is easy to produce.

Another object is to provide a signal filter that is cost effective to produce.

Another object is to provide a signal filter that is suitable for millimeter wave frequency band (20-300 GHz).

Another object is to provide a signal filter that conveniently can be used and integrate with antenna arrays.

Another object is to provide a multi-layer filter with stacked unconnected layers with low leakage.

Another object is to provide a multi-layer filter that don't require galvanic contact between the layers to reduce leakage.

Another object of the present invention is to provide a multi-layer filter that don't require connectivity between the layers to reduce leakage.

It would thus be beneficial with a filter that is compact and overcomes at least some of the drawbacks of the prior art.

Thus, the present solution relates to a cost efficient and easy to produce multi-layer signal filter being an air-filled waveguide filter with unconnected thin layers stacked together and overcoming many of the drawbacks of prior art solutions.

The multi-layer signal filter comprises at least three physical layers. Each layer has through going apertures arranged with an offset to apertures of at least one adjoining layer. Each layer further has a filter channel opening for receiving signals to be filtered. The apertures are arranged along a perimeter outside the filter channel opening and are arranged with a central surface portion increasing the edge length of the aperture.

The perimeter outside the filter channel opening is at a distance from the filter channel opening, i.e. there is at least some area of the layer between the apertures and the channel opening. The apertures are thus not in connection with the filter channel opening. The perimeter outside the filter channel opening further has a shape that in many embodiments don't correspond to the shape of the layer and/or the filter channel opening.

It is one advantage that the central surface portion increases the edge length of the apertures. This enables smaller apertures to be used with maintained performance for reducing leaks in the multi-layer filter. The size of the apertures can thus be reduced and for example correspond to, or be around, half the periodicity. The same applies for the arrangement of the apertures in each layer. EBG is a periodic structure and if using for example circular apertures the size would be lambda and the apertures would preferably be arranged and spaced apart by the distance of lambda. With the present structure as disclosed herein the size of the apertures can for example be half lambda instead and the same with the distance between the apertures. It is thus one advantage with the present solution that the apertures are designed for increased edge length.

It is a further advantage with the present solution that the apertures as described herein extends through the entire layer making each layer easier to produce.

According to an embodiment the filter channel openings of all layers in the multi-layer signal filter has at least partly overlapping areas creating a filter channel through the multi-layer signal.

The filter channel is in different embodiments arranged with different sizes of filter channel openings in the layers, in some embodiments all layers have different sizes of filter channel openings but in other embodiments some of the layers have corresponding openings. The filter channel openings, together creating the filter channel, is determining the characteristics of the filter.

The characteristics of the filter is in one embodiment further determined by the thickness of layers in the multi-layer signal filter. For example, in one embodiment narrow slots with a layer thickness of 0.5 mm provide high-pass filter characteristics. In another embodiment narrow slots with a thickness of 0.6 mm provides low-pass filter responses. In some embodiments those are combined for band-pass characteristics. In an embodiment the layer thicknesses are the same for all layers, in another embodiment the layer thickness is different for every second layer. In yet another embodiment the layer thickness of a thin layer is between 0.1-1 mm and a thick layer between 0.2-1 mm, or between 0.1-0.4 mm and a thick layer between 0.2-0.6 mm.

According to an embodiment the multi-layer signal filter has a symmetric configuration wherein half of the layers are identical.

According to an embodiment the multi-layer signal filter has an asymmetric configuration.

According to an embodiment the central surface portion comprises a second central surface portion. I.e. the central surface portion has a second aperture and a second central surface portion. It is one advantage that a second central surface portion increases the edge length of the aperture even more.

According to an embodiment the apertures of two adjoining layers in the multi-layer signal filter offsets such that an open space of said apertures completely surrounds the filter channel of the two layers.

According to another embodiment the apertures of two adjoining layers in the multi-layer signal filter offset such that an open space of said apertures substantially surrounds the filter channel of the two layers.

It is an advantage that apertures of two adjoining layers offsets such that the open space completely surrounds the filter channel of the two layers in order to optimize the EBG (electric band gap) structure and minimize the field leakage. However, it is in an embodiment possible to have small areas between the space, i.e that the apertures of two adjoining layers only creates a space that substantially surrounds the filter channel of the two layers. Non-exhaustive examples are that the apertures leave a closed space of less than 10%, 20%, or 25% of any one of the width, length, or diameter of the aperture.

The apertures of adjoining layers are arranged with an offset in relation to each other is further advantageous due to that it creates a leak suppressing structure based on EBG, electromagnetic band gap structure. Electromagnetic band gap (EBG) structure materials or structures creating EBG structures are designed to prevent the propagation of a designated bandwidth of frequencies and is in the present solution used to minimize the leakage in the multi-layer filter. This enables that a waveguide with many layers is used without the drawbacks that such a solution previously had. It should further be noted that in for example other solutions wherein electrical and galvanic contact is needed between the layers there are much more leakage in the horizontal plane than in the vertical.

According to an embodiment the apertures are arranged periodically along a perimeter outside the filter channel opening of each layer.

According to an embodiment every second layer in the multi-layer signal filter has the same number and pattern of apertures.

According to an embodiment the number of apertures in adjoining layer is different.

According to an embodiment the apertures at each layer are arranged in a pattern selected from any one of a circular, rectangular, square, and elliptical patterns along the perimeter outside the filter channel opening.

According to an embodiment the apertures are arranged in multiple patterns outside each other.

According to an embodiment the offset between the apertures of two adjoining layers corresponds to moving the apertures along the perimeter of the pattern around its center with 360/(n*2) degrees, where n is the number of apertures in the layer.

According to an embodiment the apertures of each layer are arranged at a center-to-center distance of any one of less than 75% of a wavelength, less than 50% of a wavelength, and 50% of a wavelength of the signal the multi-layer signal filter is designed for.

According to an embodiment the apertures of each layer are arranged at a center-to-center distance of the central surface portion of any one of less than 75% of a wavelength, less than 50% of a wavelength, and 50% of a wavelength of the signal the multi-layer signal filter is designed for.

According to an embodiment each aperture encompasses its central surface portion to at least 75% of the aperture edge length.

According to an embodiment the central surface portion of an aperture is connected to the rest of the layer with two or more connection tabs spanning the aperture, wherein the connection tabs is an integrated part of the layer.

According to an embodiment the central surface portion of an aperture is connected to the rest of the layer with one connection tab spanning the aperture, wherein the connection tab is an integrated part of the layer.

According to an embodiment the offset between the apertures of two adjoining layers corresponds to the any one of the length, width, and diameter of the central surface portion.

According to an embodiment the at least three layers comprise an entry layer, an intermediate layer, and an exit layer, wherein the entry layer has the same number and pattern of apertures as the exit layer.

According to an embodiment each aperture of each layer has an overlapping portion of two apertures of an adjoining layer. It is one advantage that the overlap creates a leak suppressing structure.

According to an embodiment the distance between the layers of the multi-layer signal filter is between 0 and 20 microns.

According to an embodiment the distance between the layers of the multi-layer signal filter is between 0 and 50 microns.

According to an embodiment the multi-layer signal filter is a physical multi-layer signal filter.

According to an embodiment the multi-layer signal filter is made from one single material.

According to an embodiment the multi-layer signal filter is made from layers of a single material coated with a metal.

According to an embodiment the multi-layer signal filter is assembled with a non-conductive adhesive.

According to an embodiment the layers are directly stacked.

According to an embodiment the layers are stacked unconnected thin layers.

It is one advantage that the multi-layer filter doesn't require any galvanic, electric, or physical connection between the layers. I.e. a small gap can exist between the layers. This gap could for example be an uncontrolled air gap from production of the layers. The gap could also be on micron or even an atomic level.

According to an embodiment the layers are stacked unconnected thin metal layers.

According to an embodiment the central surface portion is part of the layer.

According to an embodiment the apertures of each layer are arranged with an offset that overlaps corresponding apertures of the at least one adjoining layer.

According to an embodiment at least one through going aperture is arranged to partly surround a central surface portion. Through going apertures extending through the entire layer, wherein a leak suppressing structure is achieved by apertures arranged with an offset to adjacent apertures of adjoining layers.

According to an embodiment the multi-layer signal filter is an air-filled waveguide filter.

According to an embodiment the layers of the multi-layer filter is held together with any one of a conductive glue, an isolating glue, and two screws.

It is one advantage with the present solution that any form of bonding or attachment means can be used to hold the layers together. The reason for this is that no electric conductivity is required between the layers in order to suppress leakage. However, it shall be noted that conductivity won't affect the performance in a negative way. I.e. the multi-layer filter according to the solution as described herein works well regardless of the conductive properties between the layers.

According to one embodiment the apertures of every second layer align.

According to one embodiment the apertures are not aligned but arranged in an array of unit cell pattern creating an EBG structure.

According to one embodiment the apertures are offset from each other with a higher order symmetry.

According to an embodiment the multi-layer filter or the multi-layer filter array is arranged with an antenna or antenna array.

According to an embodiment the multi-layer signal filter comprises an entry layer, at least one intermediate layer, and an exit layer, each layer has through going apertures arranged with an offset to adjacent apertures of adjoining layers, each layer further has a filter channel opening for receiving signals to be filtered. The apertures create a leak suppressing structure surrounding the filter channel opening and the apertures are arranged with a central surface portion reducing the open area of the aperture and increasing the edge length of the aperture.

According to an aspect a plurality of multi-layer signal filters are arranged in a single unit as a multi-layer filter array. The multi-layer filter array is in one embodiment suitable to use together with an antenna array.

The solution as presented herein has multiple advantage, it is for example cost efficient to produce, through going holes are easier to produce than slots, leakage is reduced without any expensive bonding process, etc.

BRIEF DESCRIPTION OF DRAWINGS

The invention is now described, by way of example, with reference to the accompanying drawings, in which.

DESCRIPTION OF EMBODIMENTS

In the following, a detailed description of the different embodiments of the invention is disclosed under reference to the accompanying drawings. All examples herein should be seen as part of the general description and are therefore possible to combine in any way of general terms. Individual features of the various embodiments and aspects may be combined or exchanged unless such combination or exchange is clearly contradictory to the overall function of the multi-layer filter, arrangement, or production method thereof.

Briefly described the solution relates to a multi-layer filter without any requirement for electrical and galvanic contact between the layers. The multi-layer filter has a leak suppressing structure for reducing leakage between the layers of said filter. The leak suppressing structure comprise multiple apertures that are arranged along at least one perimeter outside the filter channel and the apertures are arranged with an offset between the layers creating an EBG-structure (electromagnetic band gap). The apertures further have an improved design to enable reduction of the size of the multi-layer filter.

Figure 1:
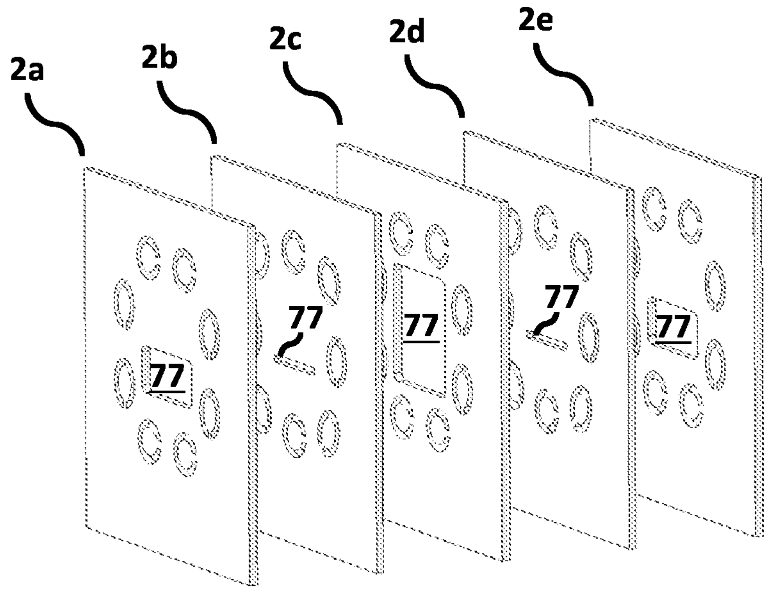
FIG. 1 illustrates layers for one embodiment of a multi-layer filter.

FIG. 1 illustrates one embodiment of multiple layers 2*a*, 2*b*, 2*c*, 2*d*, 2*e* of a multi-layer filter. The layers 2*a*, 2*b*, 2*c*, 2*d*, 2*e* each has a filter channel opening 77 for a signal to be filtered. In the embodiment as illustrated in FIG. 1 each layer solely has one filter channel opening 77 and thus the multi-layer filter is a single multi-layer filter 1. However, in other embodiment multiple filter channel openings 77 might be arranged in a single layer, i.e. for use as a multi-layer filter array 10.

FIG. 1 further illustrates multiple apertures 3 arranged around a perimeter outside the filter channel opening 77. In the embodiment as illustrated in FIG. 1 the apertures 3 are arranged in a circle pattern. It is further shown one example of offsets between apertures 3 of different layers 2*a*, 2*b*, 2*c*, 2*d*, 2*e* and that the filter channel opening 77 of the different layers 2*a*, 2*b*, 2*c*, 2*d*, 2*e* have different sizes creating characteristics of the filter 1.

Figure 2:
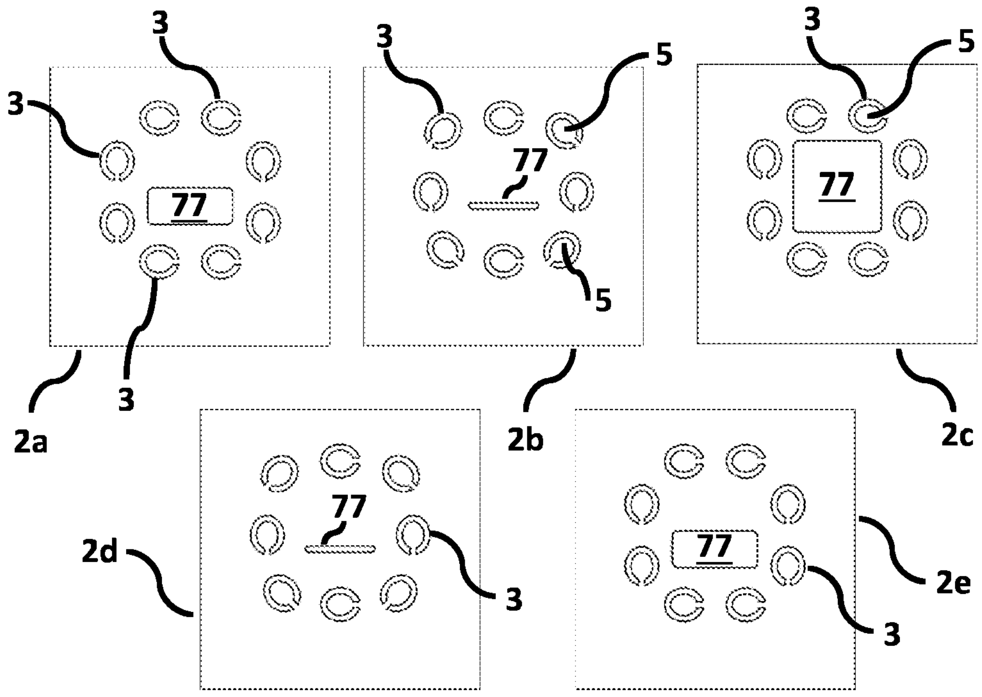
FIG. 2 illustrates another view of layers for one embodiment of a multi-layer filter.

FIG. 2 illustrates the embodiment of FIG. 1 with the layers 2*a*, 2*b*, 2*c*, 2*d*, 2*e* separately illustrated. Multiple apertures 3 of each layer 2*a*, 2*b*, 2*c*, 2*d*, 2*e* are shown as well as central surface portions 5 for each aperture 3.

Figure 3:
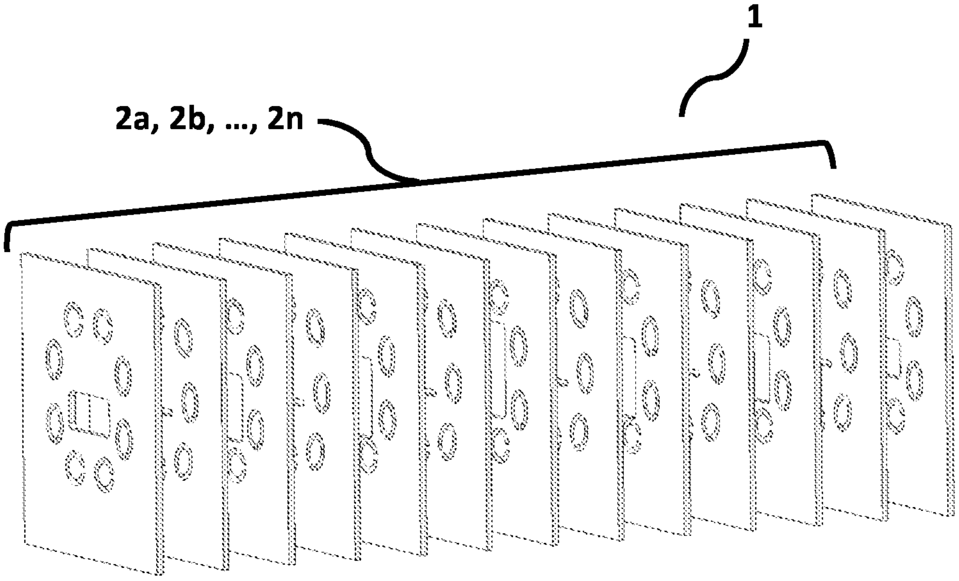
FIG. 3 illustrates layers for another embodiment of a multi-layer filter.

FIG. 3 illustrates another embodiment of a multi-layer filter 1 in a non-assembled state. The embodiment of FIG. 3 illustrates a filter with another number of layers 2*a*, 2*b*, 2*c*, . . . , 2*n*.

Figure 4:
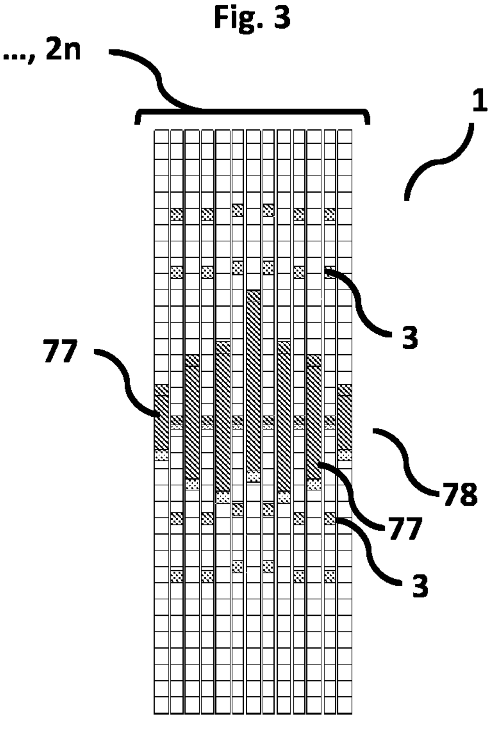
FIG. 4 illustrates a cross-section view of an embodiment of a multi-layer filter wherein the filter channel is shown.

FIG. 4 illustrates a cross section wherein offset between apertures 3 are illustrated as well as one embodiment of a filter channel 78 is shown. It shall be noted that the multi-layer filter 1 as disclosed herein may have any number of layers and/or apertures 3.

FIG. 4 further illustrates how the filter channel openings 77 of the filter channel 78 can be arranged at different positions of the extension plane of the layers 2*a*, 2*b*, 2*n* such that different filter characteristics can be achieved. It should here be noted that in one embodiment the filter channel opening 77 of the intermediate layer is adjusted further than the other layers as one example.

Figure 5:
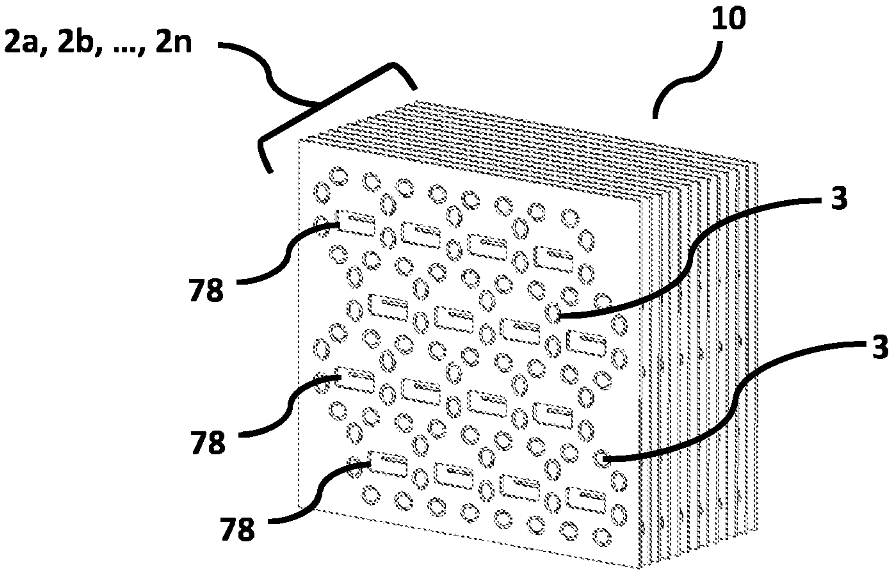
FIG. 5 illustrates an embodiment of a multi-layer filter array.

FIG. 5 illustrates a multi-layer filter array 10 comprising multiple filter channels 78, each at least partly encompassed by apertures 3. FIG. 5 thus illustrates a clear advantage of the present solution wherein multiple filters can be arranged in an array.

FIG. 5 illustrates a 4×4 array filter but any number of rows and columns is possible and depends on what is suitable for the application area.

Figure 6:
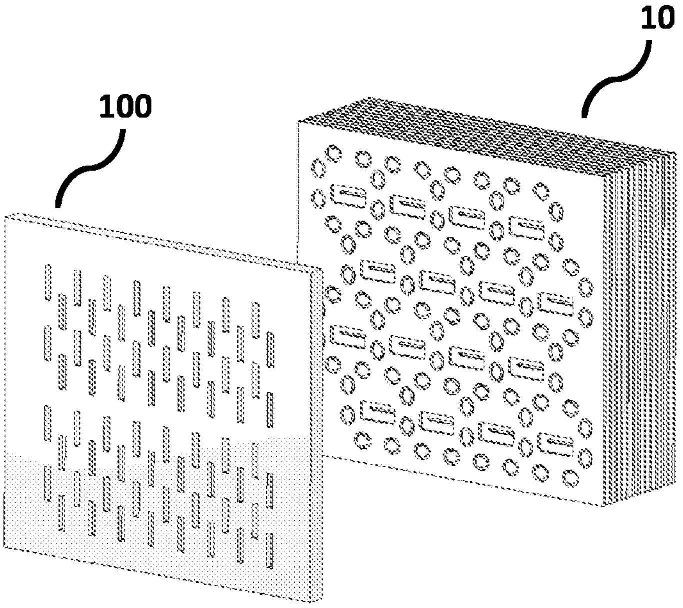
FIG. 6 illustrates one embodiment of a multi-layer filter array and an antenna array.

FIG. 6 illustrates the multi-layer filter array 10 of FIG. 5 and an antenna array 100 adapted to be attached to the multi-layer filter 10. The antenna array 100 is only an example embodiment and it is understood that many different forms of antennas can be used with the multi-layer filter array 10 as described herein.

Figure 7:
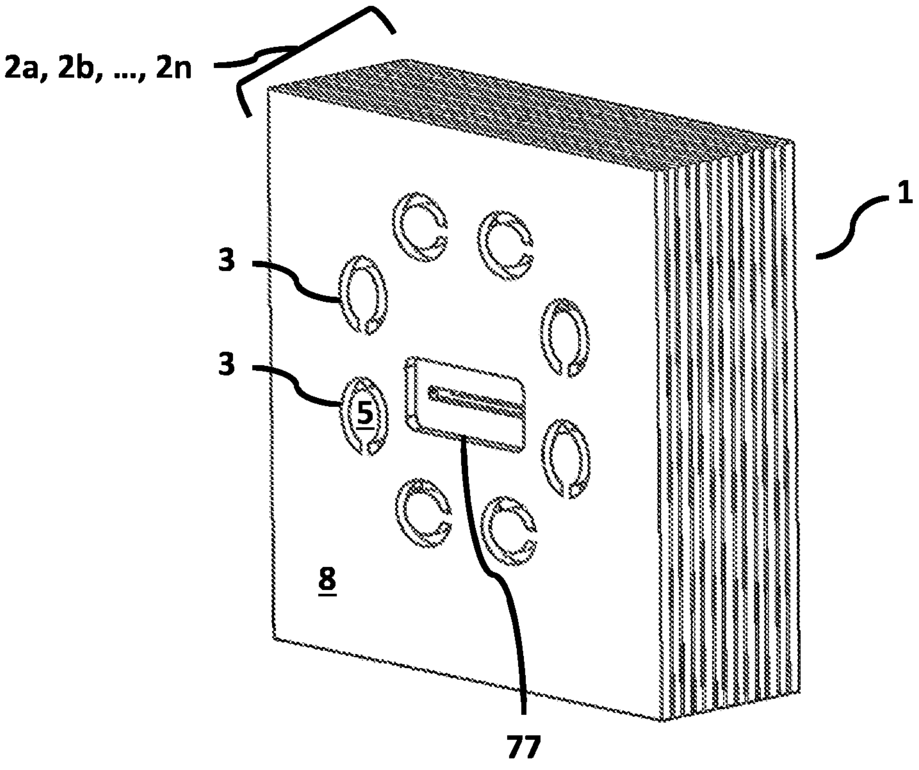
FIG. 7 illustrates one embodiment of an assembled multi-layer filter.

FIG. 7 illustrates an assembled multi-layer filter 1 of the embodiment as shown in FIGS. 1 and 2.

Figure 8:
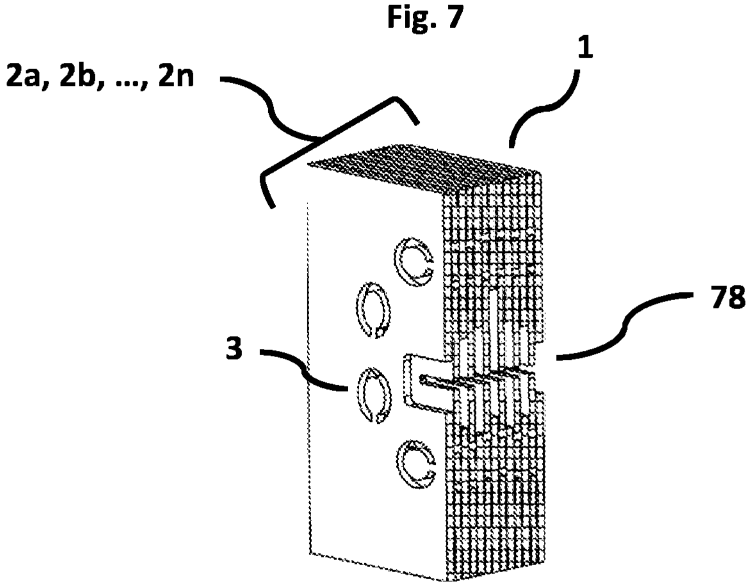
FIG. 8 illustrates a vertical cross-section of an assembled multi-layer filter.

FIG. 8 illustrates a cross-section of the embodiment as illustrated in FIGS. 1, 2 and 7 wherein the filter channel 78 is shown. The filter channel 78 might have different shape and form depending on which filter characteristics that are desired, for example if the multi-layer filter is designed as a low-pass, high-pass, or band-pass filter.

Figure 9:
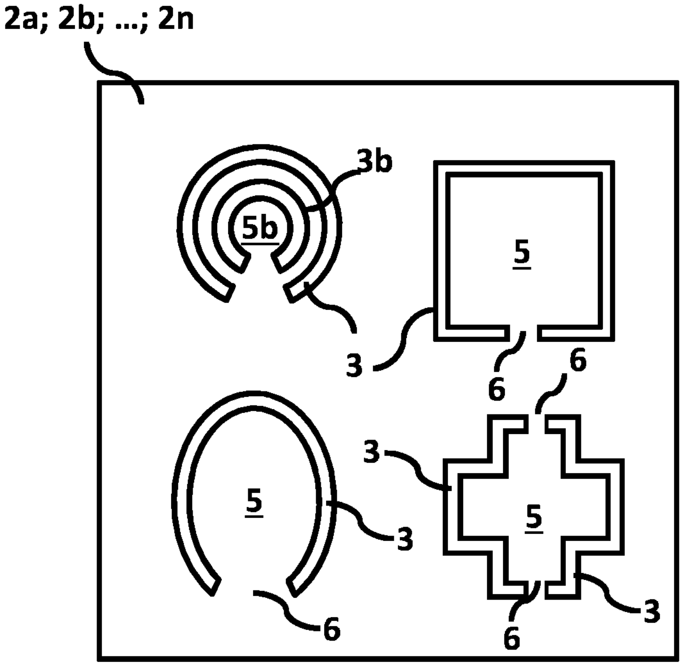
FIG. 9 illustrate examples of aperture shapes for layers of a multi-layer filter.

FIG. 9 illustrate examples of apertures 3 in layers 2*a*; 2*b*; . . . ; 2*n*. The apertures 3 may have different shape and form in different embodiments of the multi-layer filter and multi-layer filter array. It could in some embodiments also be a combination of apertures within a single filter or filter array. FIG. 9 further illustrates one example of a second aperture 3*b* and a second central surface portion 5*b* increasing the edge length of the aperture 3 even further. FIG. 9 further illustrates how the central surface portion 5 can be connected to the rest of the layer with for example one or two connection tabs 6.

Figure 10:
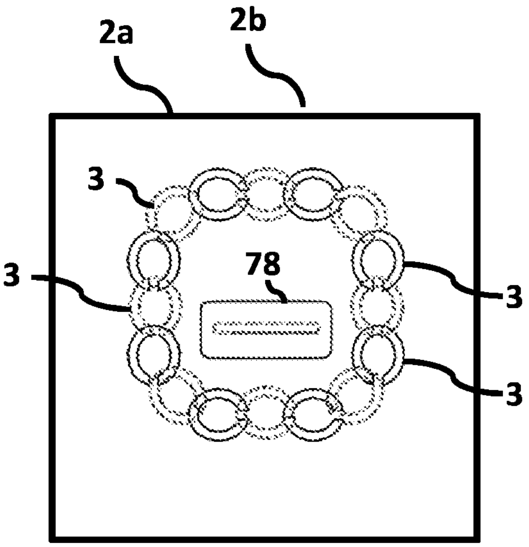
FIG. 10 illustrates two layers for one embodiment of a multi-layer filter, wherein a transparent view shows the offset of apertures in the two layers.

FIG. 10 illustrates a transparent view wherein apertures 3 of two layers 2*a*, 2*b*, are visible showing one embodiment of an offset between apertures. The dashed lines describe the second layer 2*b* that is located behind the first layer 2*a*.

In general, for the embodiments as disclosed here in the apertures arranged around the filter channel opening can be arranged at multiple outside perimeters. I.e. in an embodiment two or more outside perimeters of EBG structure apertures 3 might be used instead of one.

The invention claimed is:

1. A multi-layer signal filter comprising at least three physical layers, wherein each layer has through going apertures arranged with an offset to the apertures of at least one adjoining layer, each layer further has a filter channel opening for receiving signals to be filtered, wherein the apertures are arranged along a perimeter outside the filter channel opening, and wherein the apertures are arranged with a central surface portion increasing the edge length of the aperture.

2. The multi-layer signal filter according to claim 1, wherein the apertures are arranged periodically along a perimeter outside the filter channel opening of each layer.

3. The multi-layer signal filter according to claim 1, wherein every second layer in the multi-layer signal filter has the same number and pattern of apertures.

4. The multi-layer signal filter according to claim 1, wherein the apertures of each layer are arranged at a center-to-center distance of any one of less than 75% of a wavelength, less than 50% of a wavelength, and 50% of a wavelength of the signal the multi-layer signal filter is designed for.

5. The multi-layer signal filter according to claim 1, wherein each aperture encompasses its central surface portion to at least 75% of the aperture edge length.

6. The multi-layer signal filter according to claim 1, wherein the offset between the apertures of two adjoining layers corresponds to any one of the length, width, and diameter of the central surface portion.

7. The multi-layer signal filter according to claim 1, wherein the at least three layers comprise an entry layer, an intermediate layer, and an exit layer, wherein the entry layer has the same number and pattern of apertures as the exit layer.

8. The multi-layer signal filter according to claim 1, wherein each aperture of each layer has an overlapping portion of two apertures of an adjoining layer.

9. The multi-layer signal filter according to claim 1, wherein the distance between the layers of the multi-layer signal filter is between 0 and 50 microns.

10. The multi-layer signal filter according to claim 1, wherein the multi-layer signal filter is an air-filled waveguide filter.

11. A multi-layer signal filter array, comprising a plurality of multi-layer signal filters arranged in a single unit, wherein the multi-layer signal filters are filters according to claim 1.

12. The multi-layer signal filter according to claim 1, wherein the apertures of two adjoining layers in the multi-layer signal filter offset such that an open space of said apertures completely surrounds the filter channel of the two layers.

13. The multi-layer signal filter according to claim 12, wherein the apertures are arranged periodically along a perimeter outside the filter channel opening of each layer.

14. The multi-layer signal filter according to claim 12, wherein every second layer in the multi-layer signal filter has the same number and pattern of apertures.

15. The multi-layer signal filter according to claim 1, wherein the apertures at each layer are arranged in a pattern selected from any one of a circular, rectangular, square, and elliptical patterns along the perimeter outside the filter channel opening.

16. The multi-layer signal filter according to claim 15, wherein the offset between the apertures of two adjoining layers corresponds to moving the apertures along the perimeter of the pattern around its center with 360/(n*2) degrees, where n is the number of apertures in the layer.

17. The multi-layer signal filter according to claim 1, wherein the filter channel openings of all layers in the multi-layer signal filter have at least partly overlapping areas creating a filter channel through the multi-layer signal filter.

18. The multi-layer signal filter according to claim 17, wherein the apertures of two adjoining layers in the multi-layer signal filter offset such that an open space of said apertures completely surrounds the filter channel of the two layers.

19. The multi-layer signal filter according to claim 17, wherein the apertures are arranged periodically along a perimeter outside the filter channel opening of each layer.

20. The multi-layer signal filter according to claim 17, wherein every second layer in the multi-layer signal filter has the same number and pattern of apertures.

* * * * *